US008605739B2

(12) United States Patent
Karaoguz et al.

(10) Patent No.: US 8,605,739 B2
(45) Date of Patent: *Dec. 10, 2013

(54) EXTENDED MULTIMEDIA CALL HANDLING FUNCTIONALITY

(71) Applicant: Broadcom Corporation, Irvine, CA (US)

(72) Inventors: Jeyhan Karaoguz, Irvine, CA (US); James D. Bennett, San Clemente, CA (US); Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/676,710

(22) Filed: Nov. 14, 2012

(65) Prior Publication Data

US 2013/0072163 A1    Mar. 21, 2013

Related U.S. Application Data

(63) Continuation of application No. 13/448,803, filed on Apr. 17, 2012, now Pat. No. 8,335,222, and a continuation of application No. 13/176,642, filed on Jul. 5, 2011, now Pat. No. 8,179,911, and a continuation of application No. 12/778,078, filed on May 11, 2010, now Pat. No. 7,974,296, and a continuation of application No. 11/093,938, filed on Mar. 30, 2005, now Pat. No. 7,715,351.

(60) Provisional application No. 60/591,735, filed on Jul. 28, 2004, provisional application No. 60/591,842, filed on Jul. 28, 2004, provisional application No. 60/591,843, filed on Jul. 28, 2004, provisional application No. 60/591,845, filed on Jul. 28, 2004, provisional application No. 60/591,841, filed on Jul. 28, 2004, provisional application No. 60/591,844, filed on Jul. 28, 2004, provisional application No. 60/591,847, filed on Jul. 28, 2004.

(51) Int. Cl.
*H04L 12/28* (2006.01)

(52) U.S. Cl.
USPC ........ 370/401; 370/338; 370/352; 455/412.1; 455/417; 455/445

(58) Field of Classification Search
USPC .......................... 370/401, 338, 328, 352–356; 455/412.1–412.2, 415, 445
See application file for complete search history.

(56) References Cited

U.S. PATENT DOCUMENTS

| | | | |
|---|---|---|---|
| 5,583,864 A | 12/1996 | Lightfoot et al. |
| 5,610,970 A | 3/1997 | Fuller et al. |
| 5,677,905 A | 10/1997 | Bigham et al. |
| 5,727,057 A | 3/1998 | Emery et al. |
| 5,742,905 A | 4/1998 | Pepe et al. |
| 5,905,726 A | 5/1999 | Gupta |
| 5,999,525 A | 12/1999 | Krishnaswamy et al. |
| 6,278,704 B1 | 8/2001 | Creamer et al. |

(Continued)

*Primary Examiner* — Sharad Rampuria
(74) *Attorney, Agent, or Firm* — Brinks Gilson & Lione

(57) ABSTRACT

A method and apparatus supporting the handling of calls using multimedia information are disclosed. Multimedia information exchanged by an associated access device and a gateway. The access device may request for the multimedia information to be recorded during a call. The gateway may store the received multimedia information locally or may communicate the multimedia information to storage.

20 Claims, 8 Drawing Sheets

(56) References Cited

U.S. PATENT DOCUMENTS

| | | |
|---|---|---|
| 6,442,251 B1 | 8/2002 | Maes et al. |
| 6,477,369 B1 | 11/2002 | Moghe et al. |
| 6,483,912 B1 | 11/2002 | Kalmanek et al. |
| 6,690,933 B1 | 2/2004 | Chapman et al. |
| 6,731,625 B1 | 5/2004 | Eastep et al. |
| 6,745,025 B1 | 6/2004 | Chow et al. |
| 6,754,181 B1 | 6/2004 | Elliott et al. |
| 6,823,050 B2 | 11/2004 | Brown et al. |
| 6,947,738 B2 | 9/2005 | Skog et al. |
| 7,046,269 B2 | 5/2006 | Parker et al. |
| 7,120,139 B1 | 10/2006 | Kung et al. |
| 7,277,445 B2 | 10/2007 | Bartfeld et al. |
| 7,289,490 B1 | 10/2007 | Kalmanek et al. |
| 7,342,917 B2 | 3/2008 | Mohan et al. |
| 7,362,727 B1 | 4/2008 | O'Neill et al. |
| 7,391,763 B2 | 6/2008 | Brown et al. |
| 7,420,956 B2 * | 9/2008 | Karaoguz et al. ............. 370/338 |
| 7,492,886 B1 | 2/2009 | Kalmanek et al. |
| 7,680,133 B2 | 3/2010 | Karaoguz et al. |
| 7,715,351 B2 * | 5/2010 | Karaoguz et al. ............. 370/338 |
| 7,974,296 B2 * | 7/2011 | Karaoguz et al. ............. 370/401 |
| 7,986,704 B2 | 7/2011 | Karaoguz et al. |
| 8,179,911 B2 * | 5/2012 | Karaoguz et al. ............. 370/401 |
| 8,335,222 B2 * | 12/2012 | Karaoguz et al. ............. 370/401 |
| 2003/0223407 A1 | 12/2003 | Sharma et al. |
| 2004/0063427 A1 | 4/2004 | Narasimha et al. |
| 2004/0209604 A1 | 10/2004 | Urban et al. |
| 2005/0124326 A1 | 6/2005 | Belkin et al. |
| 2005/0246742 A1 | 11/2005 | Benco et al. |

\* cited by examiner

US 8,605,739 B2

EXTENDED MULTIMEDIA CALL HANDLING FUNCTIONALITY

CROSS REFERENCE TO RELATED APPLICATIONS

The present application is a continuation of U.S. patent application Ser. No. 13/448,803, entitled "Extended Call Handling Functionality Using Multi-Network Simulcasting," filed Apr. 17, 2012 which is a continuation of U.S. patent application Ser. No. 13/176,642, entitled "Method And System For Extended Network Access Services Advertising Via A Broadband Access Gateway," filed Jul. 5, 2011 which is a continuation of U.S. patent application Ser. No. 12/778,078 filed May 11, 2010, which is a continuation of U.S. patent application Ser. No. 11/093,938 filed Mar. 30, 2005 which makes reference to, claims priority to, and claims the benefit of the following United States Provisional Patent Applications, the complete subject matter of each of which is hereby incorporated herein by reference, in its entirety.

U.S. Provisional Application Ser. No. 60/591,735 entitled "Method and System for Handoff Through Simulcasting," filed Jul. 28, 2004;

U.S. Provisional Application Ser. No. 60/591,847 entitled "Method and System for Handling Calls Through Simulcasting," filed Jul. 28, 2004;

U.S. Provisional Application Ser. No. 60/591,844 entitled "Method and System for Handling Multimedia Information Through Simulcasting," filed Jul. 28, 2004;

U.S. Provisional Application Ser. No. 60/591,841 entitled "Method and System Simulcasting or Multicasting Multimedia Information in a Broadband Wired and/or Wireless LAN or Personal Area Network," filed Jul. 28, 2004;

U.S. Provisional Application Ser. No. 60/591,845 entitled "Method and System for Consuming Simulcasted and Multicasted Content in a PAN/WAN/WLAN Serviced by a Broadband Access Gateway," filed Jul. 28, 2004;

U.S. Provisional Application Ser. No. 60/591,843 entitled "Method and System for Handoff of a Multimedia Stream by Sniffing," filed Jul. 28, 2004; and U.S. Provisional Application Ser. No. 60/591,842 entitled "Method and System for Sniffing to Provide Association with a New Network," filed Jul. 28, 2004.

The present application also makes reference to U.S. patent application Ser. No. 11/021,294, entitled "Method and System for Extended Network Access Services Advertising Via A Broadband Access Gateway" filed Dec. 23, 2004, the complete subject matter of which is hereby incorporated herein by references, in its entirety.

BACKGROUND

One major common problem faced by cellular and landline service providers is market competition. In today's climate of competitive markets, cellular service providers have found that one way for them to grow market share and defend their businesses is to be proactive and form alliances, and to partner with landline service providers. In addition, cellular service providers seek to differentiate their service offerings, and to capture the largest portion of market revenue by meeting an ever increasing demand for access to a wide range of media forms such as MP3 encoded audio, still and video imaging, data, instant messaging, and email. In a similar manner, the landline service providers have found that to grow market share and ward off competition, they too must be proactive and form alliances, and to partner with cellular service providers. Support for broad economical access to these converging forms of communication is needed to enable unfettered market growth, and to support the development and use of new handheld devices needed to provide increasing levels of mobile multimedia communication functionality.

Although the formation of alliances and partnerships between cellular service providers and landline service providers may help to ward off competition, such alliances and partnerships are faced with other problems. For example, the erection of cellular infrastructure such as cellular towers may be an expensive venture since this may require acquisition of real estate, whether in the form of outright purchases or through leasing. Cellular infrastructure also requires the establishment of one or more expensive backbone links to handle core network traffic. Another cellular-related problem is that the cellular signals do not penetrate and propagate in buildings such as homes and offices very well. This is especially true with the frequencies that are typically utilized in the United States, which may vary between 800 MHz and 1900 MHz or 1.9 GHz.

Present day communication networks and, in particular, wireless networks, are subject to varying conditions that may cause temporary losses of signal, and can ultimately lead to loss of a call. Some of the participants on the call may not receive all of the information exchanged by the parties during the call due to poor communication conditions. There are also times when portions of a call are of importance and one or more parties wish to have a record of the call.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and method for handling calls in a wide area network using simulcasting of multimedia information via a broadband access gateway, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings

BRIEF DESCRIPTION OF THE DRAWINGS

The innovation may be better understood with reference to the following drawings and description. In the figures, like reference numerals designate corresponding parts throughout the different views.

DETAILED DESCRIPTION

Certain embodiments of the present invention relate to communication over a hybrid wired and wireless networks. More specifically, certain embodiments of the present invention relate to a method and system for call handling through simulcasting of wireless network traffic for an active subscriber from a wireless service provider servicing the active subscriber to a broadband wired and/or a wireless LAN, and/or PAN using a broadband access gateway.

An aspect of the present invention provides seamless merging of wide area networks (WANs), from any kind of wired and/or wireless wide area networks, to pockets of wired and/or wireless local area networks (WLANs) and personal area network (PANs), which may be located in homes or other environment such as an office or business. The merging of these various types of networks enables transparent communication of all types of media between access devices, which may be wired or wirelessly coupled to one or more of these networks. Seamless communication may be provided to access devices as they transition from one type of network to another type of network.

Figure 1:
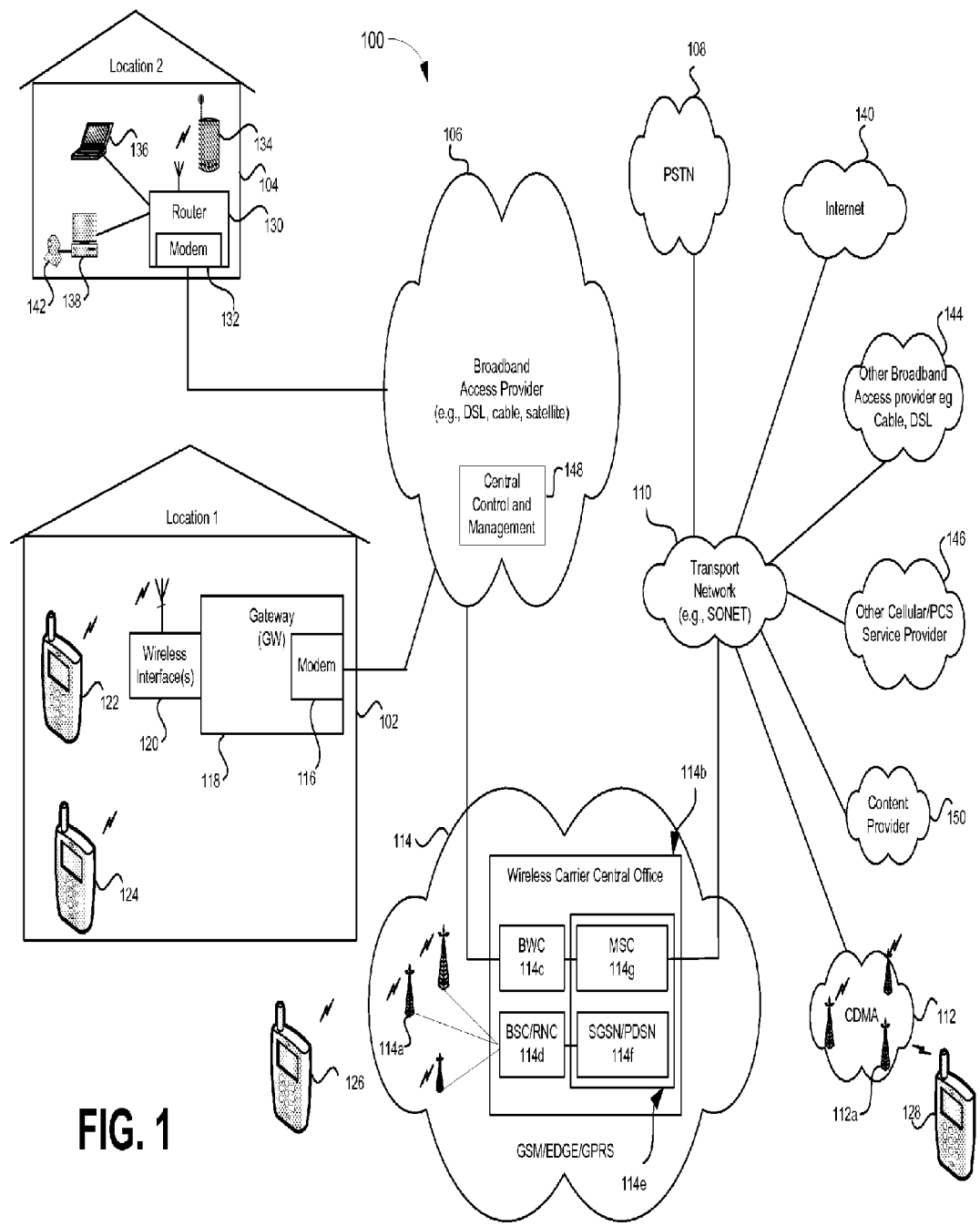
FIG. 1 is a block diagram illustrating an architecture of an exemplary communications system in which a representative embodiment of the present invention may be practiced.

FIG. 1 is a block diagram illustrating an architecture of an exemplary communications system in which a representative embodiment of the present invention may be practiced. Referring to FIG. 1, there is shown a first location 102, a second location 104, a broadband access provider (BAP) 106, a public switched telephone network (PSTN) 108, a transport network 110, wireless service provider networks including a CDMA network 112 and a GSM/EDGE/GPRS network 114, and access devices 122, 124, 126, and 128. The first location 102 comprises a gateway 118 having a modem 116, a wireless interface(s) block 120, and the access devices 122, 124. The access devices 122, 124, 126, 128 may comprise, for example, a mobile multimedia handset having a high level of functionality such as, for example, that of one or more of a digital video or still camera, a portable audio (MP3) player, a personal digital assistant, and a voice handset. The access devices 122, 124, 126, 128 may be capable of operating using, for example, a personal area network and/or wireless local area network compliant with, for example, Bluetooth, IEEE 802.11a/b/g/n, and/or IEEE 802.15.3a ultra-wideband standards. The second location 104 comprises a router 130 having a modem 132, and a plurality of wireless access devices. The plurality of wireless access devices at the second location 104 may comprise a personal computer (PC) 138, a laptop 136 and a wireless personal digital assistant (PDA) 134. A peripheral such as a digital camera 142 may be coupled to the personal computer 138. Other peripherals such as printers, digital scanners, speakers, and the like, which are not shown, may also be coupled to the personal computer 138 and/or laptop 136. The wireless interface block 120 may comprise a plurality of interfaces such as a Bluetooth interface, an IEEE 802.15.3a ultra-wideband interface, and any combination of an IEEE 802.11a, b, g and/or n interface.

FIG. 1 also comprises an "other broadband access provider" block 144, an "other cellular/PCS service provider" block 146, a central control and management block 148, and content provider 150. The "other broadband access provider block 144" may be, for example, a cable, DSL, or other type of broadband access provider. The central control and management block 148 may comprise suitable logic, circuitry and/or code that may be adapted to handle content delivery and security functions such as authentication, validation, key or certificate management, and authorization. The central control and management block 148 may also be adapted to handle provisioning, service management, and accounting. In a representative embodiment of the present invention, the central control and management block 148 may establish communications links with, for example, the gateway 118, the broadband access provider 106, the other broadband access provider 144, the other cellular/PCS service provider 146, the CDMA network 112, and the GSM/EDGE/GPRS network 114 using actual or virtual connections.

The broadband access provider 106 may be, for example, a cable operator, telephone company, or satellite operator providing Internet access along with other communication services. In instances where BAP 106 is a telephone company, broadband service to locations 102, 104 may be provided via DSL or other broadband access technology. Accordingly, the modems 116, 132 may be DSL modems. In instances where BAP 106 is a cable operator, broadband service to locations 102, 104 may be provided via cable. Accordingly, the modems 116, 132 may be DOCSIS compliant or other type of cable modem. Given the rapid decrease in the cost of leased telephone lines over the past decade or more, the connection to the location 102, 104 may also be T1 or T3 connections. For example, a switch located at a central office (CO) (not shown) may be utilized to couple a T1 or T3 connection between the second location 104 and the PSTN 108.

The gateway 118 may comprise an integrated DSL modem, cable modem or other high-speed modem that may be required for handling a connection such as a T1 or T3 connection. Alternatively, the gateway 118 may be coupled to an external DSL modem, cable modem or other high-speed modem that may be capable of handling connections such as a T1 or a T3 connection. The gateway 118 may be adapted so that it has access to protocol stack information that may be related to the GSM and/or CDMA networks 114, 112, respectively. The gateway 118 may also be adapted to provide protocol support for communication with "other cellular/PCS service provider" block 146.

Each of the CDMA and GSM/EDGE/GPRS networks 112, 114 may comprise a plurality of cell sites (a/k/a cellular towers) that are located in geographical cells within each of the networks. Within the GSM/EDGE/GPRS network 114, each of the cell sites such as, for example, cell site 114a may comprise a base transceiver station (BTS), and one or more base transceiver stations (BTSs) may be coupled to wireless carrier central office 114b. The wireless carrier central office 114b may comprise a base station controller/radio network controller (BSC/RNC) such as BSC/RNC 114d. One or more base station controllers/radio network controllers (BSCs/RNCs) may be coupled to the core network 114e, that comprises a network edge switch called a mobile switching center (MSC), such as MSC 114g, and a serving GPRS support node (SGSN)/packet data serving node (PDSN) 114f, of the GSM/EDGE/GPRS network 114. The mobile switching center may be coupled to, for example, the PSTN 108 via the transport network 110. As an access device moves out of range of a first cell site to within range of a second cell site, the decrease signal power received from the first cell site and the increase in signal power received from the second cell site causes initiation of handoff of a call from the first cell site to the second cell site. In cases where there is no second cell site to handoff to, the call may be maintained by the first cell site power until it is attenuated to a threshold where it is no longer feasible to maintain the call. At the point where the power reaches or falls below this threshold, the call may drop and any related call resources may be relinquished. In a home and/or office environment, it may be desirable to have a second network to which the call may be handed off to.

As an illustration, a user may be on their way home and as the user approaches their home, the signal may fall below a minimum signal power threshold that is required to maintain a call. However, instead of dropping the call, the call may be handed off to, for example, a PAN or a wireless local area network (WLAN) that may be located within the user's home or an unlicensed wireless access system that may be located in the user's home. For example, with reference to FIG. 1, as access device 126 migrates from the vicinity of the serving cell site 114a in GSM/EDGE/GPRS network 114 towards the wireless interface 120 in the first location 102, the call may be handed off from the cell site 114a of the GSM/EDGE/GPRS network 114 to the wireless interface 120 coupled to the gateway (GW) 118 at the first location 102. Accordingly, instead of the call being dropped, the call has been seamlessly handed off and is now being handled by the gateway 118 via the wireless interface 120. The resulting wireless data may then be communicated to the GSM/EDGE/GPRS network 114 via the broadband connection to the BAP 106 which is connected to the broadband wireless local area network controller (BWC) 114c.

In a representative embodiment of the present invention, voice and data traffic related to an existing active wireless call or connection for a subscriber may be routed from a serving wireless service provider such as, for example, the GSM/EDGE/GPRS network 114 to a broadband wired and/or a wireless WAN, LAN, and/or PAN using a broadband access gateway such as, for example, the gateway 118, so as to provide seamless handoff. The broadband wired and/or a wireless LAN (WLAN), and/or PAN using the broadband access gateway may be located in a home, for example. Simulcasting is the simultaneous broadcasting of the same information over two different communication paths or channels. Accordingly, in a representative embodiment of the present invention, voice and data related traffic may be simulcasted to an access device and to the home broadband access gateway upon initiation of a call, in addition to receipt of a call from a calling party. In the former case where a calling party places a call to a called party, related voice and data for the called party and/or the calling party may be communicated to the broadband access gateway 118. When the calling party is at home, the calling party may use their access device or some other access device that is now serviced by the broadband access gateway 118 for further communication.

With reference to FIG. 1, the access device 126 that may be, for example, a mobile multimedia handset, may initiate a call destined for the access device 128 that may also be, for example, such as a mobile multimedia handset. Once the call is setup and established, the mobile access device 126 may be serviced by a cell site such as, for example, the cell site 114a located in the GSM/EDGE/GPRS network 114, while the mobile access device 128 may be serviced by a cell site such as, for example, the cell site 112a located in the CDMA network 112. While communication is active between the mobile access devices 126 and 128, the mobile access device 126 may enter a region in which the reception is poor and as a result, the user of the mobile access device 126 may have a desire to record the call so that it may be subsequently replayed.

In one representative embodiment of the present invention, a soft or hard button may be utilized to activate recording of the conversation between users of the mobile access devices 126 and 128. The wireless carrier central office 114b and/or the mobile wireless carrier central office may be adapted to detect when the signal level has fallen below a specified threshold and thereby cause the soft button for recording to be displayed on the mobile access device. The wireless carrier central office 114b may also be adapted to determine whether there is sufficient bandwidth and available space to handle recording of the call at the broadband access gateway 118. In another representative embodiment of the present invention, the recording of the call may be stored at a location other than the broadband access gateway 118 such as, for example, another access device in communication with the broadband access gateway 118. If the wireless carrier central office 114b determines that there is insufficient bandwidth and/or memory for storing the recorded conversation, then the wireless carrier central office 114b may send an indication to the mobile access device 126, that initiated the recording. In the case where there is a hard button available, the hard button may be depressed or otherwise enabled in order to activate remote recording at the broadband access gateway 118.

The hard or soft button may also be utilized to terminate remote recording of an existing call between the mobile access devices 126 and 128. In this regard, the hard or soft button may be depressed in order to terminate recording of an existing call.

There may be instances where a user of the mobile access device 126 desires to record only a portion of an existing call. For example, during an existing call where the user of mobile access device 126 is the calling party, the called party may want to give the calling party a telephone number and/or address. Immediately prior to receiving the telephone number and/or address, the calling party may activate or initiate remote recording of the conversation at the first location 102 via the broadband access gateway 118 by depressing the soft or hard key on the mobile access device 126. Once the called party has completed disclosing the telephone number and/or address, the calling party may deactivate recording by depressing the soft or hard key on the mobile access device 126. Once the mobile access device 126 is within operating range of the broadband access gateway 118, for example, when the user of mobile access device 126 is at the first location 102, the user may play back the recording on the mobile access device 126, or on another access device such as, for example, a personal computer coupled to the broadband access gateway 118.

A user may be on a conference call with a plurality of other wireless and wired users and may choose to store a portion of the conference call at the broadband access gateway 118, while at the same time attending to an urgent second call. In this regard, the conference call may still be active and being recorded while the user tends to another call. After completing the urgent second call, the user may switch back to the teleconference and may continue to record the conference call at the broadband access gateway 118, or terminate recording of the conference call using the soft or hard button.

In another representative embodiment of the present invention, whenever recorded media is stored at broadband access gateway such as, for example, the broadband access gateway 118 of FIG. 1, a notification of the stored recorded media may be presented on a mobile access device such as, for example, the mobile access device 126. Hence, a special pop-up menu showing an identifier of one or more stored media may be automatically displayed on the called mobile access device 126 whenever the mobile access device 126 is within an operating range of the gateway 118. The popup menu may comprise playback keys that may be utilized to play back the recording and may include, for example, play, forward, rewind and stop.

Figure 2:
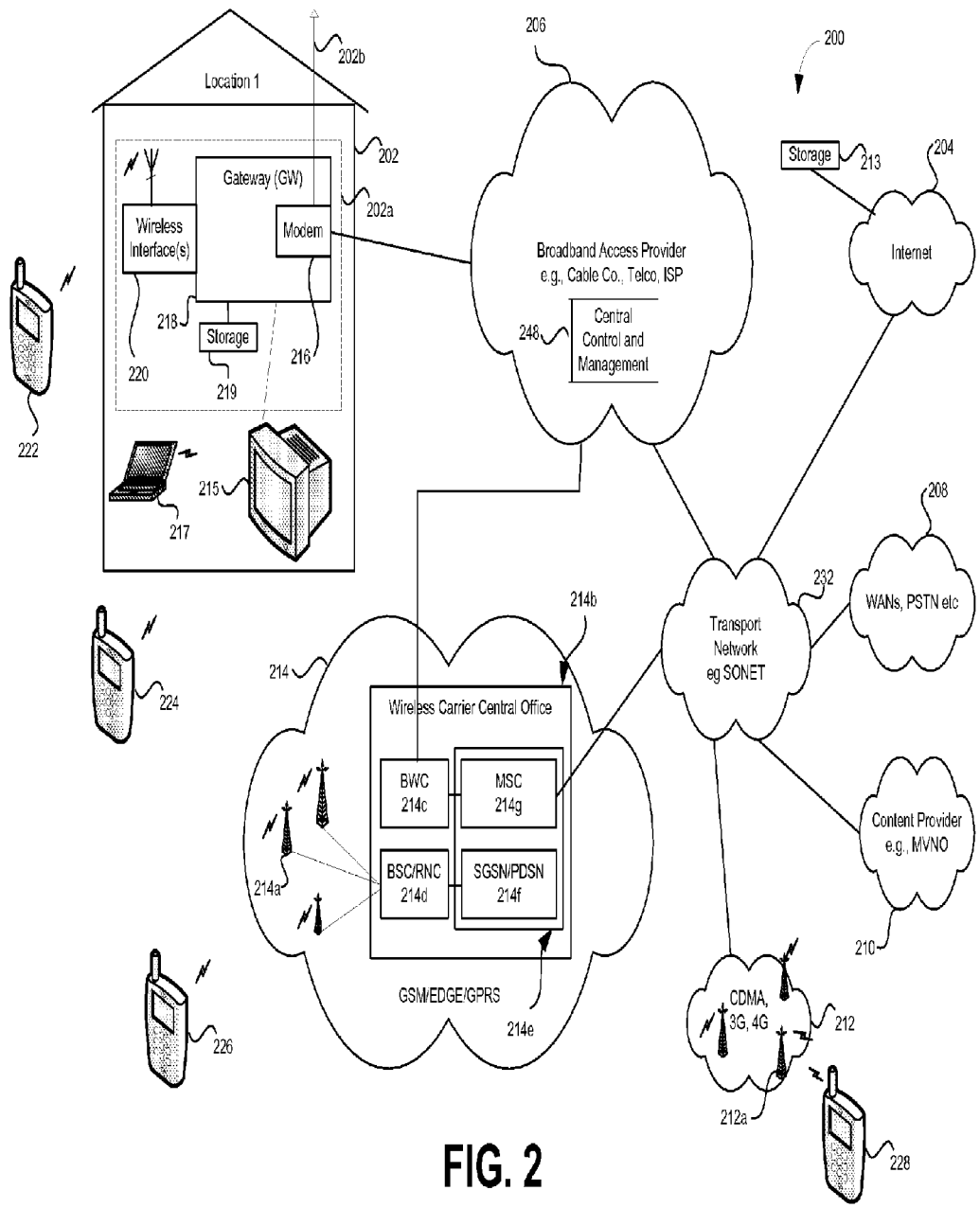
FIG. 2 shows a block diagram illustrating an exemplary communication system that may support handling calls through simulcasting of multimedia information, in accordance with a representative embodiment of the present invention.

FIG. 2 shows a block diagram illustrating an exemplary communication system 200 that may be utilized for handoff through simulcasting of multimedia information, in accordance with a representative embodiment of the present invention. The exemplary communication system 200 of FIG. 2 provides handoff through simulcasting for wireless network traffic, for an active subscriber, from a wireless service provider servicing the active subscriber to a broadband wired and/or a wireless LAN, and/or PAN using a broadband access gateway. Referring to FIG. 2, there is shown a first location 202, a broadband access provider (BAP) 206, a transport network block 232, an Internet 204, a WANs, PSTN, etc networks block 208, a content providers block 210, wireless wide area service provider networks 212, 214, and a plurality of mobile access devices 222, 224, 226, 228 The wireless interface 220, the gateway 218 with modem 216, BAP 206, the GSM/EDGE/GPRS network 214, the transport network 232, and the CDMA network 236 of FIG. 2 may correspond, for example, to the wireless interface 120, the gateway 118 with modem 116, the BAP 106, the GSM/EDGE/GPRS network 114, the transport network 110, and the CDMA network 112, respectively, of FIG. 1. The illustration of FIG. 2 also comprises a central control and management block 248 that may correspond, for example, to the central control and management block 148 of FIG. 1.

The first location 202 comprises a broadband access gateway 218 with a modem 216, and a wireless interface 220. The first location may be a home, and the broadband access gateway 218 with the modem 216 and the wireless interface 220 may support a personal area network (PAN) and/or wireless local area network (WLAN), and may be referred to as a home network 202a. The wireless interface 220 may comprise a plurality of interfaces such as a Bluetooth interface, an IEEE 802.15.3a ultra-wideband interface, and any combination of IEEE 802.11a, b, g and/or n interfaces. In a representative embodiment of the present invention, the gateway 218 may comprise, for example, a set top box that may be coupled in a wireless or wired fashion to access devices such as, for example, a laptop computer or television, such as the laptop 217 and the television 215 of FIG. 2. Service may be provided to the home network 202a supported by the gateway 218 via the cable modem 216, which is coupled to the broadband access provider 206.

The broadband access provider 206 may be, for example, a cable company, telephone company (Telco), or an Internet service provider (ISP). The broadband access provider 206 may utilize any of the standardized formats such as DOCSIS, digital subscriber line (DSL), or local multipoint distribution system (LMDS). LMDS utilizes broadband wireless technology to deliver voice, video, data, and/or Internet services utilizing licensed or unlicensed spectrum in the frequency range of 25-GHz and higher. LMDS utilizes point-to-point or point-to-multipoint communication to provide broadband services, some of which rely on line of sight (LOS). LMDS is a fixed wireless solution, and as such, no mobility support is required.

The broadband access provider 206 may be also be a WiMAX or Institute of Electronic and Electrical Engineers, Inc. (IEEE) 802.16-compliant service provider. The IEEE 802.16 standard offers a wireless metropolitan area network (MAN) air interface which provides network access to buildings via external antennas that receive signals from a remotely located central base station. The signal received at the building may be communicated to a wired network infrastructure such as an IEEE 802.3 compliant communication network or a wireless network infrastructure such as an IEEE 802.11a/b/g and/or n-compliant network. In instances where WiMAX is utilized, then antenna 202b may be utilized to receive and transmit signals between the broadband access provider 206 and the home network 202a.

The WANs, PSTN, etc networks block 208 may comprise networks such as private or public communication networks. For example, the WANs, PSTN, etc networks block 208 may comprise a public switched telephone network (PSTN) and a packet network such as a cellular digital packet data (CDPD) network.

The content providers block 210 may comprise network providers, which supply data and/or multimedia content. In a representative embodiment of the present invention, the content providers block 210 may comprise one or more mobile virtual network operators (MVNOs). A MVNO is a mobile service provider that provides mobile services to its subscribers by utilizing the network infrastructure of another company. In this regard, the MVNO enters into an agreement with a network operator to purchase network time such as minutes, which it resells to it own customers/subscribers. The MNVO utilizes the purchased time to provide, for example, multimedia content delivery to its subscribers.

The wireless service provider network 212 may, for example, utilize CDMA, 3G or 4G access technology and may comprise a plurality of cell sites. Cell site 212a may provide cellular service to mobile access device 228 while the mobile access device 228 is within range of the cell site 212a. The wireless service provider network 214 may, for example, utilize the time division multiple access (TDMA) access technology of the GSM standard, and may include enhanced data rates for GSM evolution (EDGE) and/or general packet radio service (GPRS) data capability. The wireless service provider network 214 may comprise a plurality of cell cites and a wireless carrier central office 214b, the latter of which comprises a mobile switching center (MSC) 214g. Cell site 214a may provide cellular service to mobile access device 226 while the mobile access device 226 is within range of the cell site 214a.

Figure 3:
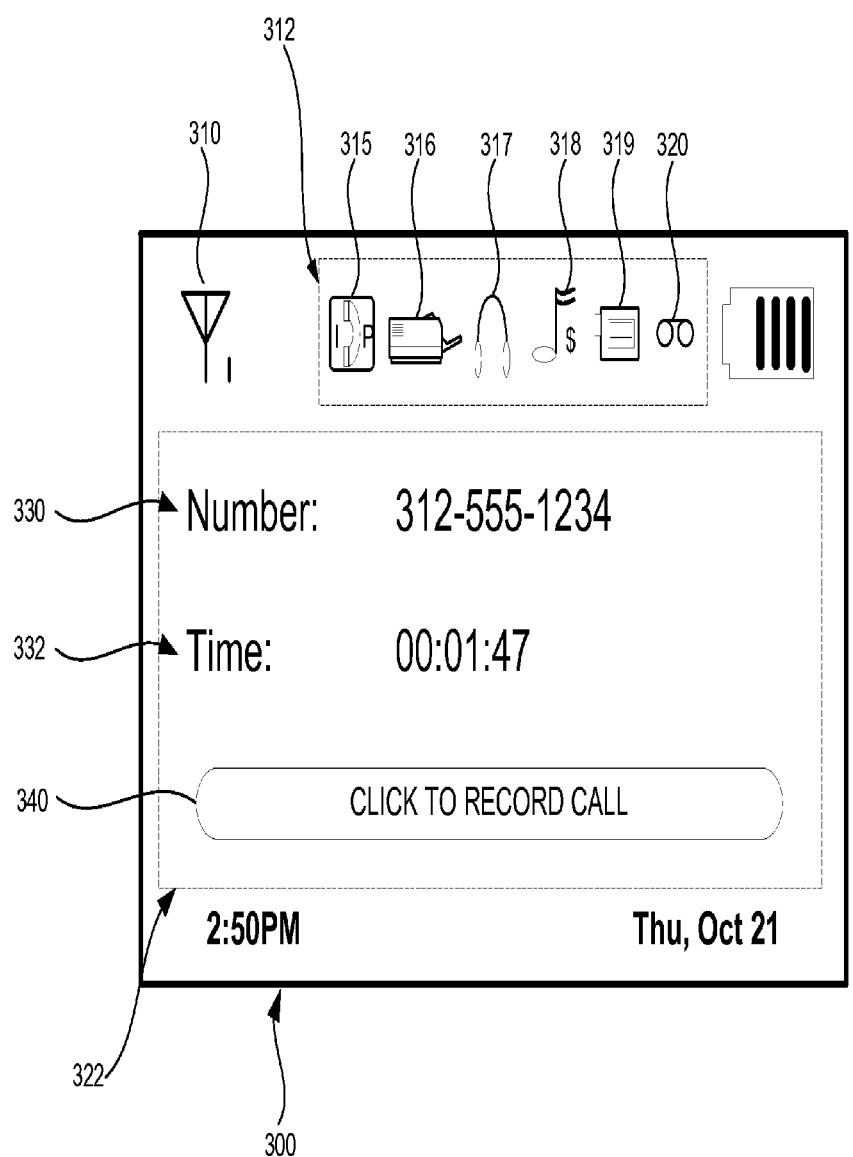
FIG. 3 illustrates a display showing an exemplary active call screen that may be displayed by an access device that may correspond, for example, to the access device of FIG. 2, in accordance with a representative embodiment of the present invention.

With reference to FIG. 2, the mobile access device 226 that may comprise, for example, a mobile multimedia handset may initiate a call destined for the mobile access device 228. The mobile access device 228 may also be a mobile multimedia handset. Once the call is setup and established, the mobile access device 226 may be serviced by cell site 214a located in the GSM/EDGE/GPRS network 214, while mobile access device 228 may be serviced by cell site 212a located in the CDMA network 212. While communication is active between the mobile access devices 226 and 228, the mobile access device 226 may enter a region in which the reception is poor and as a result, the user of mobile access device 226 may have a desire to record the call so that it may be subsequently replayed. In one representative embodiment of the present invention, a soft or hard button may be utilized to activate recording of the conversation between users of the mobile access devices 226 and 228. The recording may be stored on the storage 219. In another representative embodiment of the present invention, the recording of the call communication may be stored on another access device that is accessible to the gateway 218 such as, for example, the wireless laptop 217, or other access devices accessible via the wireless interface 220, the modem 216, or wired access devices in communication with the gateway 218. For example, a recording of the call may be stored by the gateway 218 on storage 213 that is illustrated as accessible to the gateway 218 via the path comprising the modem 216, the broadband access provider 206, the transport network 232, and the Internet 204. Although the discussion of the present invention focuses mainly upon aspects related to the recording and playback of voice communication, the present invention is not limited to this particular aspect. A variety of representative embodiments are contemplated, in which various forms of multimedia information for a call may be recorded for later playback. Multimedia information may comprise, for example, streaming video, broadcast video, voice, digital data, text, digitized audio, digitized still images, digitized video, and digitized music FIG. 3 illustrates a display 300 showing an exemplary active call screen 322 that may be displayed by an access device that may correspond, for example, to the mobile access device 224 of FIG. 2, in accordance with a representative embodiment of the present invention. The display 300 of FIG. 3 comprises a network indicator 310, a network services indicator area 312, a battery life indicator, a time of day indicator, and a day and date indicator. The network services indicator area 312 of FIG. 3 comprises an Internet protocol (IP) phone service icon 315, a printer service icon 316, a stereo entertainment icon 317, a pay music service icon 318, a video entertainment icon 319, and a call recording icon 320 showing those services that may be advertised by a broadband access gateway such as, for example, the gateway 218 of FIG. 2, as being available to an appropriately identified or authorized user of the access device. Further information about the advertising of multimedia information and media-related services by a broadband access gateway may be found in U.S. patent application Ser. No. 11/021,294, entitled "Method And System For Extended Network Access Services Advertising Via A Broadband Access Gateway" filed Dec. 23, 2004, the complete subject matter of which is hereby incorporated herein by reference, in its entirety.

In a representative embodiment of the present invention, the active call screen 322 of FIG. 3 may be displayed, for example, following initiation or reception of a call by an access device such as, for example, the mobile access devices 224, 226, 228 of FIG. 2. The active call screen 322 shown in FIG. 3 comprises a calling/called number indicator 330, a call time indicator 332, and a call record button 340. A representative embodiment of the present invention may use an icon such as call recording icon 320, or a similar graphical or textual messaging mechanism, to notify a user that recording of a call serviced by a wide area network such as, for example, the GSM/EDGE/GPRS network 214, may be supported by a broadband access gateway such as, for example, the broadband access gateway 218 of FIG. 2. The GSM/EDGE/GPRS network 214 or the mobile access device 224, for example, may determine that the mobile access device 224 being served is associated with a broadband access gateway capable of call recording. The GSM/EDGE/GPRS network 214 or mobile access device 224, for example, may then cause the mobile access device 224 to present a display such as the display 300 to the user of the mobile access device 224. In a representative embodiment of the present invention, the call recording icon 320 and the call record button 340 may not appear if the mobile access device 224 has no associated broadband access gateway. Association of an access device such as, for example, the mobile access device 224, and a broadband access gateway such as, for example, the broadband access gateway 218 of FIG. 2 may be detected by a wide area network using identification information provided by or available from the mobile access device 224. This identification information may be provided, for example, when the access device enters, or while within the coverage area of the wide area network. The identification information may comprise, for example, access device identifiers, network addresses, media access control (MAC) addresses, electronic serial numbers, personal identification numbers (PINs) of users, and digital certificates.

In a representative embodiment of the present invention, the wireless carrier central office 214b of FIG. 2 may be adapted to determine whether there is sufficient bandwidth and available space to handle recording of the call at the broadband access gateway 218. If the wireless carrier central office 214b determines that there is insufficient bandwidth and/or memory for storing the recorded conversation, then the wireless carrier central office 214b may send an indication to the mobile access device 226, that initiated the recording.

Figure 4:
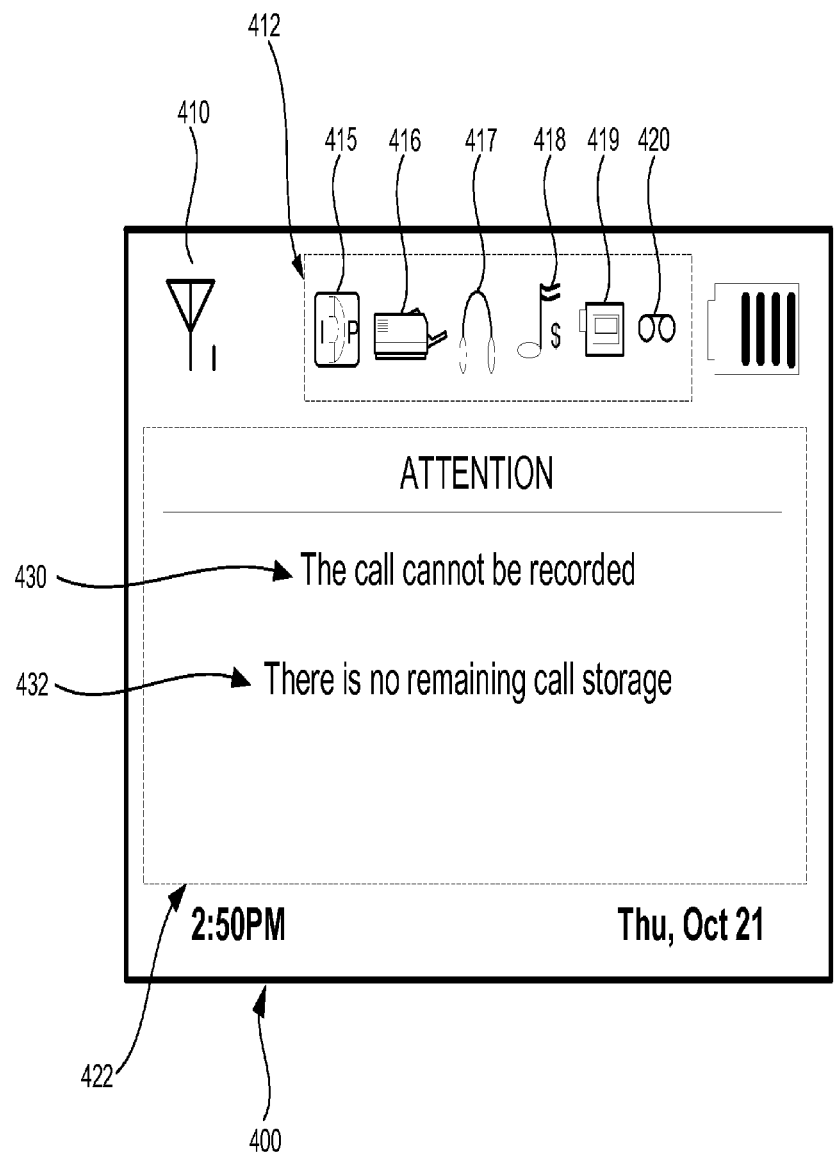
FIG. 4 illustrates a display showing an exemplary error message screen that may be displayed by an access device that may correspond, for example, to the access device of FIG. 2, in accordance with a representative embodiment of the present invention.

FIG. 4 illustrates a display 400 showing an exemplary error message screen 422 that may be displayed by an access device that may correspond, for example, to the mobile access device 224 of FIG. 2, in accordance with a representative embodiment of the present invention. The display 400 of FIG. 4 comprises a network indicator 410, a network services indicator area 412, a battery life indicator, a time of day indicator, and a day and date indicator. The network services indicator area 412 of FIG. 4 comprises an Internet protocol (IP) phone service icon 415, a printer service icon 416, a stereo entertainment icon 417, a pay music service icon 418, a video entertainment icon 419, and a call recording icon 420 showing those services that may be advertised by a broadband access gateway such as, for example, the gateway 218 of FIG. 2, as being available to an appropriately identified or authorized user of the access device.

A representative embodiment of the present invention may display information such as that presented in FIG. 4 on an access device such as, for example, one of the mobile access devices 224, 226, 228 of FIG. 2 following an attempt to activate call recording following the example given above with respect to FIG. 3. The mobile access device 224, for example, may display information such as the text 430 informing the user of the mobile access device 224 that the call cannot be recorded, and the text 432 explaining that no storage for the recording of the call is available. Other situations may also arise that prohibit the recording of call information including, for example, the lack of bandwidth in the path from the wireless carrier central office 214b of FIG. 2 to the broadband access gateway 218, a failure to establish communication between the wireless carrier central office 214b and the broadband access gateway 218, the fact that the broadband access gateway 218 is currently busy, to name only a few.

In an representative embodiment of the present invention, the wireless carrier central office 214b and/or the mobile access device 226 may be adapted to detect when the signal level has fallen below a specified threshold and thereby cause a soft button for recording to be displayed on the mobile access device 226. In the case where there is a hard button available, the hard button may be depressed or otherwise enabled in order to activate remote recording at the broadband access gateway 218. The hard or soft button may also be utilized to terminate remote recording of an existing call between the mobile access devices 226 and 228. In this regard, the hard or soft button may be depressed in order to terminate recording of an existing call.

Figure 5:
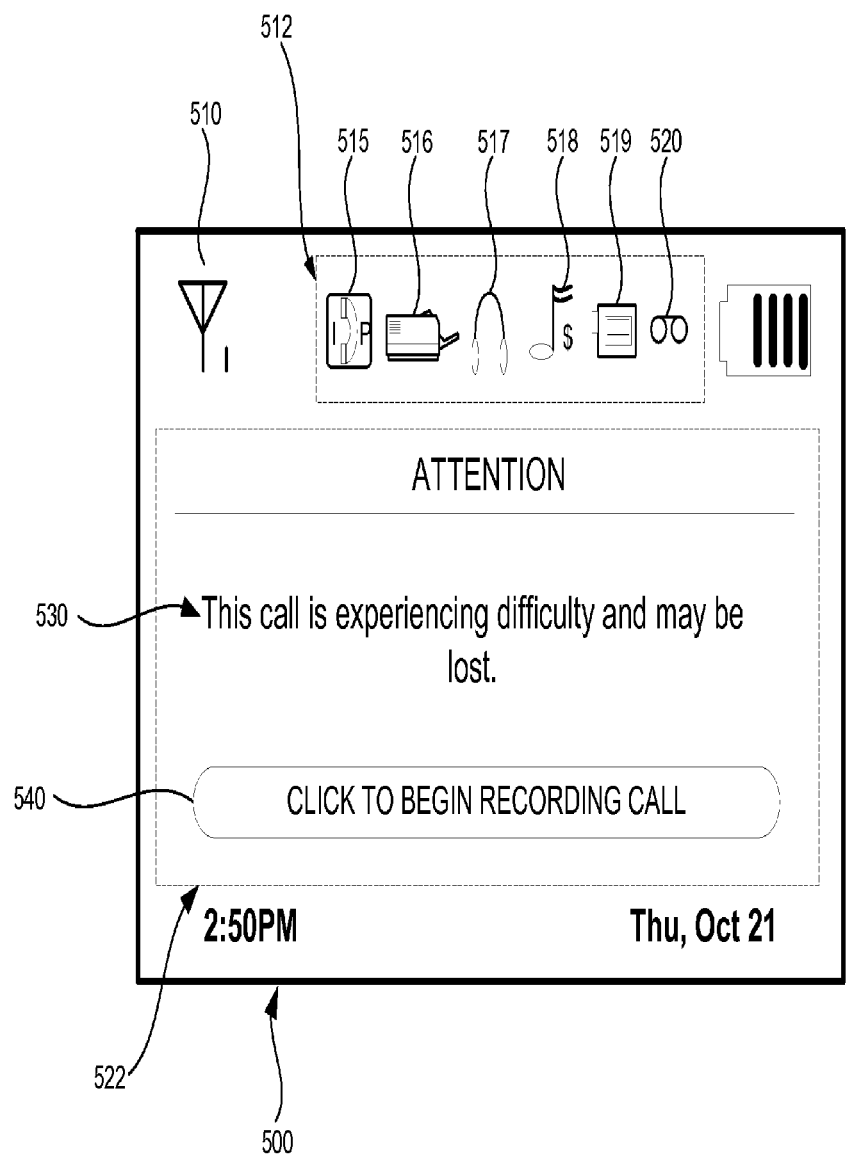
FIG. 5 illustrates a display showing an exemplary warning message screen that may be displayed by an access device that may correspond, for example, to the access device of FIG. 2, in accordance with a representative embodiment of the present invention.

FIG. 5 illustrates a display 500 showing an exemplary warning message screen 522 that may be displayed by an access device that may correspond, for example, to the mobile access device 224 of FIG. 2, in accordance with a representative embodiment of the present invention. The display 500 of FIG. 5 comprises a network indicator 510, a network services indicator area 512, a battery life indicator, a time of day indicator, and a day and date indicator. The network services indicator area 512 of FIG. 5 comprises an Internet protocol (IP) phone service icon 515, a printer service icon 516, a stereo entertainment icon 517, a pay music service icon 518, a video entertainment icon 519, and a call recording icon 520 showing those services that may be advertised by a broadband access gateway such as, for example, the gateway 218 of FIG. 2, as being available to an appropriately identified or authorized user of the access device.

An access device such as, for example, the mobile access device 224 of FIG. 2, that may comprise, for example, a mobile multimedia handset may display information like that presented in FIG. 5, while being served by a wide area network such as, for example the GSM/EDGE/GPRS network 214 of FIG. 2. In the illustration of FIG. 5, the state of the network indicator 510 represents a low signal strength condition that may cause a call to be lost. Other conditions of a communication link such as, for example, interference and noise may also affect the viability of a call. In a representative embodiment of the present invention, one or both of a wide area network such as, for example, the wireless carrier central office 214b of the GSM/EDGE/GPRS network 214, and an access device such as, for example, the mobile access device 224, may determine that poor signal quality may result in loss of the call. As previously described, an access device such as mobile access device 224, for example, may be associated with a broadband access gateway, and as a result, the mobile access device 224 may display an icon such as the call recording icon 520 of FIG. 5, indicating that call recording is available.

In a representative embodiment of the present invention, a user of an access device may be notified when conditions exist that may result in loss of a call, and if available may be offered the option of recording the call for later playback. In such a situation, the user of the access device may be presented with a visual indication such as the warning message screen 522, permitting the user to enable the recording of the call by the associated broadband access gateway. In the example of FIG. 5, the user may be presented with a brief statement of the call situation such as, for example, the text 530, and may be permitted to enable call recording by clicking on or selecting, for example, a record button 540. In another representative embodiment of the present invention, call recording may be enabled by the user for all calls, or for only those calls that meet certain conditions such as, for example, call impairment (e.g., as above), calls to or from certain parties, calls at certain times of the day, to name only a few examples. Notification to other parties on the call that recording is taking place may be provided. Once call recording is active, the user of the access device for which recording was initiated may be presented with other options and information such as, for example, the duration of the current recording, and a button (not shown) enabling the user of the access device to halt recording. Should the associated broadband access gateway exhaust available call storage, or should other difficulties arise, the user may be notified that call recording cannot continue. In such a situation, call recording may be automatically de-activated.

In a representative embodiment of the present invention, there may be instances where a user of an access device such as, for example, the mobile access device 224 of FIG. 2 (e.g., a mobile telephone) desires to record only a portion of an existing call. For example, during an existing call where the user of, for example, the mobile access device 224 is the calling party, the called party may want to give the calling party a telephone number and/or address. Immediately prior to receiving the telephone number and/or address, the calling party may activate or initiate remote recording of the conversation at the first location 202 via the associated broadband access gateway 218 by depressing a soft or hard key on the mobile access device 224 such as, for example, the call record button 340 of FIG. 3. Once the called party has completed disclosing the telephone number and/or address, the calling party may deactivate recording by depressing a similar or the same soft or hard key on the mobile access device 224. Once the mobile access device 224 is within operating range of the wireless interface 220 of the associated broadband access gateway 218, for example, (i.e., when the user of mobile access device 224 is at the first location 202), the user may play back the recording on the mobile access device 224. In various representative embodiments of the present invention, the user may also choose to use another access device such as, for example, a personal computer coupled to the broadband access gateway 218, or an access device capable of accessing the broadband access gateway 218 using, for example, the broadband connection supported by the modem 216 of FIG. 2. In such an arrangement, the user of the mobile access device 224 may play back the recording while being served by the a wide area network accessible via the broadband connection supported by modem 216. This may enable a user of the mobile access devices 222,224, 226, 228 to access recordings while in the coverage areas of the GSM/EDGE/GPRS network 214 and the CDMA network 212.

Figure 6:
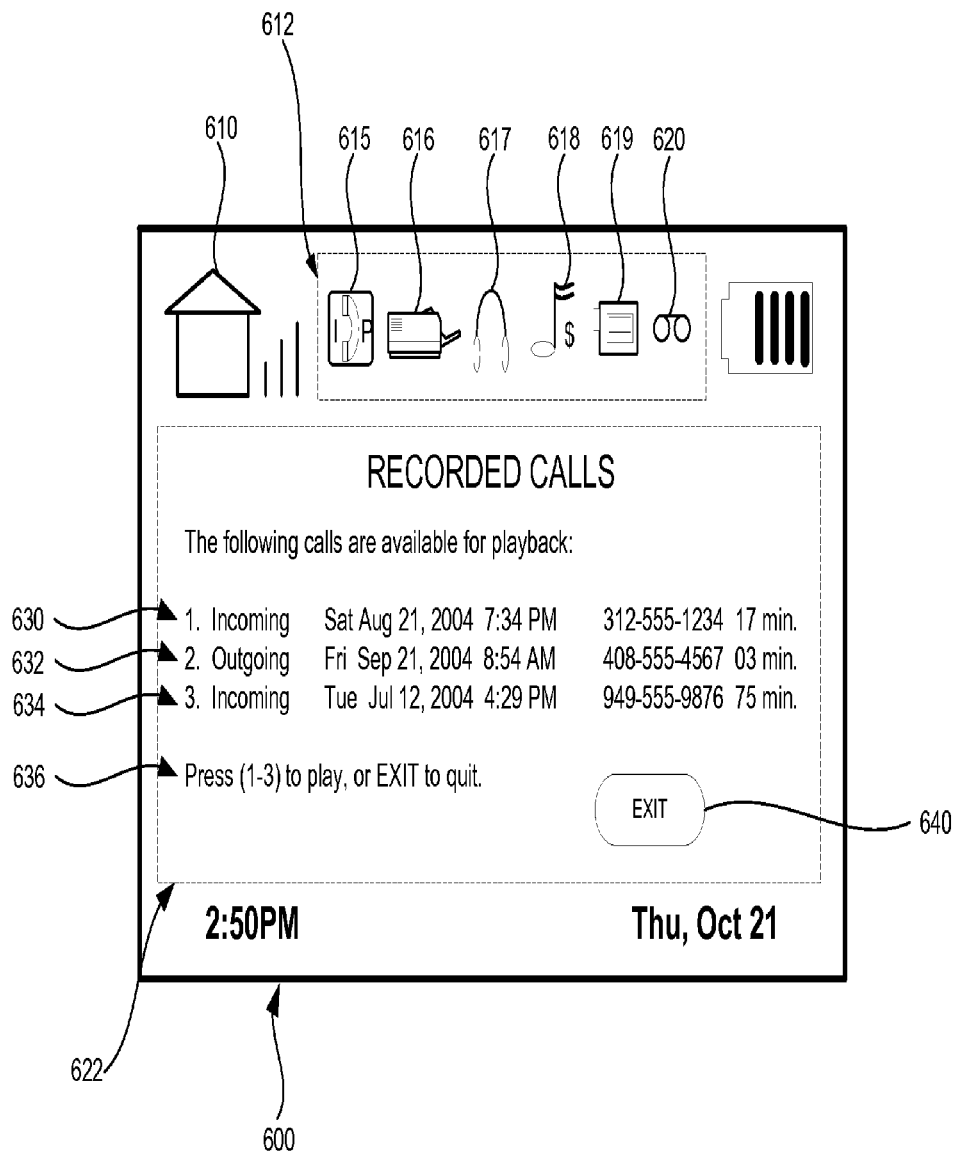
FIG. 6 illustrates a display showing an exemplary recorded calls screen that may be displayed by an access device that may correspond to, for example, the access device of FIG. 2, in accordance with a representative embodiment of the present invention.

FIG. 6 illustrates a display 600 showing an exemplary recorded calls screen 622 that may be displayed by an access device that may correspond to, for example, the mobile access device 224 of FIG. 2, in accordance with a representative embodiment of the present invention. The display 600 of FIG. 6 comprises a network indicator 610, a network services indicator area 612, a battery life indicator, a time of day indicator, and a day and date indicator. The network services indicator area 612 of FIG. 6 comprises an Internet protocol (IP) phone service icon 615, a printer service icon 616, a stereo entertainment icon 617, a pay music service icon 618, a video entertainment icon 619, and a call recording icon 620 showing those services that may be advertised by a broadband access gateway such as, for example, the gateway 218 of FIG. 2, as being available to an appropriately identified or authorized user of the access device. In the illustration of FIG. 6, the network indicator 610 of the display 600 is shown in a form representing communication with a personal area network (PAN) or wireless local area network (WLAN) of a broadband access gateway such as, for example, that supported by the wireless interface 220 of the gateway 218, shown in FIG. 2.

The recorded calls screen 622 shown in FIG. 6 also comprises recorded call entries 630, 632, 634 representing three calls recorded by a user of an access device such as, for example, the mobile access device 224 of FIG. 2. The recorded call entries 630, 632, 634 of FIG. 6 each contain information indicating whether the recorded call is an incoming or outgoing call, the date and time of the call, the calling or called number, and the length of the recording. The user of the mobile access device 224 may, for example, select from one of the listed calls, or may exit the recorded calls screen 622 by selecting the EXIT button 640. Although described with reference to an access device such as, for example, a mobile multimedia handset, the information shown in FIG. 6 may also be presented via other access devices (e.g., wireless personal digital assistants, personal computers, and the like) and using other forms of user interface (e.g., a graphical rather than textual interface), without departing from the spirit and scope of the present invention.

Figure 7:
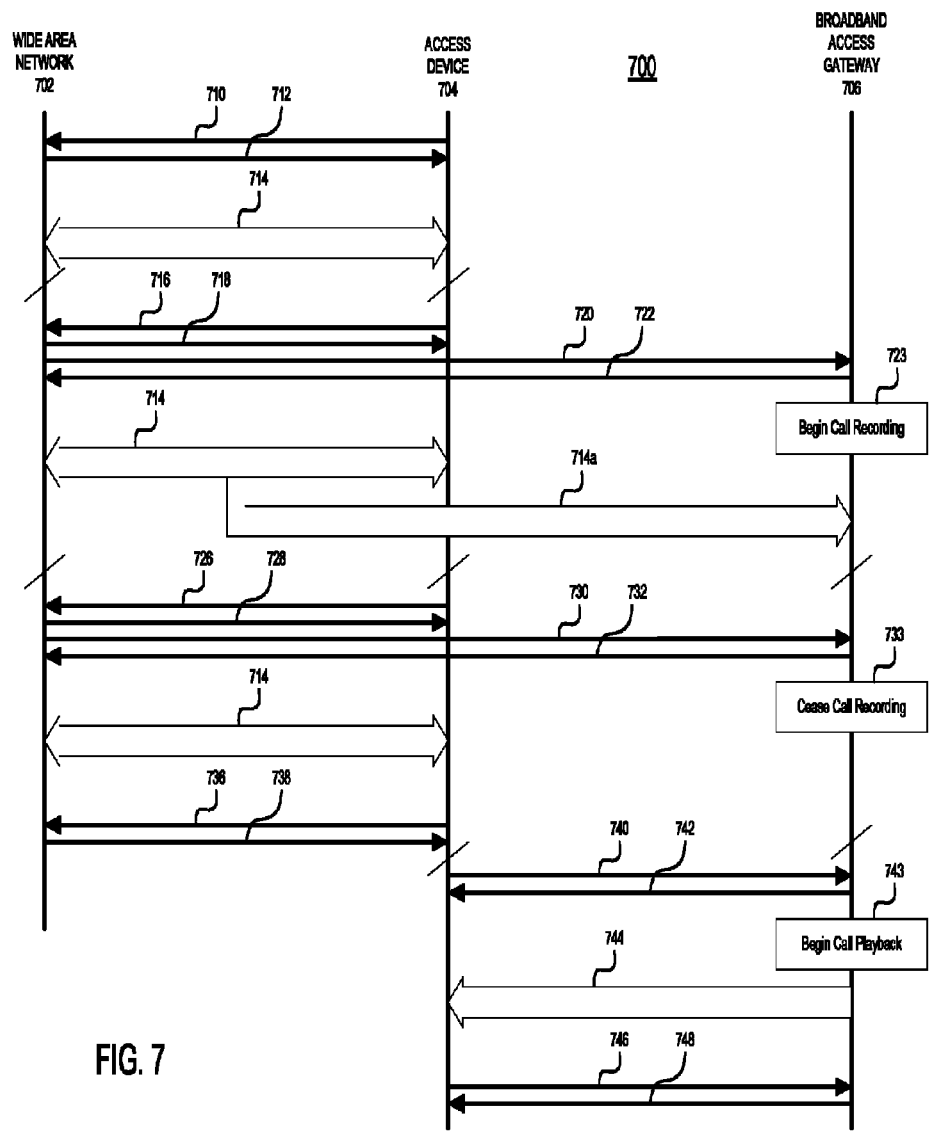
FIG. 7 is a message exchange or "ping-pong" diagram illustrating exemplary messaging during a call by a user of an access device served via a wide area network, during which call recording by an associated broadband access gateway is enabled by the user, in accordance with a representative embodiment of the present invention.

FIG. 7 is a message exchange or "ping-pong" diagram 700 illustrating exemplary messaging during a call by a user of an access device such as, for example, the mobile access devices 222, 224, 226, 228 of FIG. 2 being served via a wide area network such as, for example, the GSM/EDGE/GPRS network 214 of FIG. 2, during which call recording by an associated broadband access gateway is enabled by the user, in accordance with a representative embodiment of the present invention. In the illustration of FIG. 7, the three vertical lines represent a wide area network 702, an access device 704, and a broadband access gateway 706 that may correspond, for example, to the GSM/EDGE/GPRS network 214, the mobile access device 224, and the broadband access gateway 218, respectively, of FIG. 2. The horizontal lines represent message traffic or groups of messages exchanged between a source and a destination, the destination being indicated by the arrow head. The vertical dimension represents time, advancing downward on the message exchange diagram 700.

In a representative embodiment of the present invention, an access device 704 may initiate or receive a call via the wide area network 702 using messaging 710, 712. The messaging 710, 712 may comprise multiple messages for establishing a wireless call on the wide area network 702. In the illustration of FIG. 7, the wide area network 702 may activate a path to transport multimedia information (e.g., voice signals) 714 between the wide area network 702 and the access device 704. At some point during the call, the user of the access device 704 may desire to record the call, and may cause a call recording request message 716 to be sent to the wide area network 702. Although depicted in FIG. 7 as a request from the access device 704, in another representative embodiment of the present invention, the recording request message 716 may also originate from within the wide area network 702 when, for example, it is detected that the call may be lost. The wide area network 702 may then send an acknowledgement message 718 to the access device 704, and may also send a record start message 720 to the broadband access gateway associated with the access device 704. The association of the access device 704 and the broadband access gateway 706 may be established earlier in the call, for example, when identification information is provided by the access device 704 to the wide area network 702 (messaging not shown), as described above. Upon receiving the record start message 720, the broadband access gateway 706 may send an acknowledgement message 722, and may enable recording of call information for the call from the wide area network 702. Upon receipt of the acknowledgement message 722, the wide area network may begin simulcasting the multimedia information (e.g., voice signals) 714 of the call to the broadband access gateway 706 via a second path as multimedia information (e.g., voice signals) 714a, which is then stored by the broadband access gateway 706.

At yet a later point in time, the user of the access device 704 may choose to end recording of the call, and may cause a recording halt request message 726 to be sent to the wide area network 702. The wide area network 702 may respond with an acknowledgement message 728, and may transmit a stop call recording message 730 to the associated broadband access gateway 706. The broadband access gateway 706 may send an acknowledgement message 732 to the wide area network 702, and may then cease call recording 733 by terminating the storage of multimedia information (e.g., voice signals) for the call. Upon receiving the acknowledgement message 732, the wide area network may cease simulcasting the multimedia information (e.g., voice signals) 714a, and may maintain the path carrying multimedia information (e.g., voice signals) 714 between the wide area network 702 and the access device 704. The call may continue, for example, until the user of the access device 704 causes a call terminate message 736 to be sent to the wide area network 702. The wide area network 702 may then respond with an acknowledgement message 738, ending the call.

In a representative embodiment of the present invention, the access device 704 may later enter into wireless or wired communication with the broadband access gateway 706, and may send a call playback message 740 requesting multimedia information (e.g., voice signals) for the call that was recorded earlier. The broadband access gateway 706 may send an acknowledgement message 742, and may arrange playback of the requested call 743. The broadband access gateway 706 may then activate a path and send multimedia information (e.g., voice signals) 744 to the access device 704. The access device may later send a stop playback message 746, ending playback of the recorded call, and the broadband access gateway 706 may respond with an acknowledgement message 748.

Figure 8:
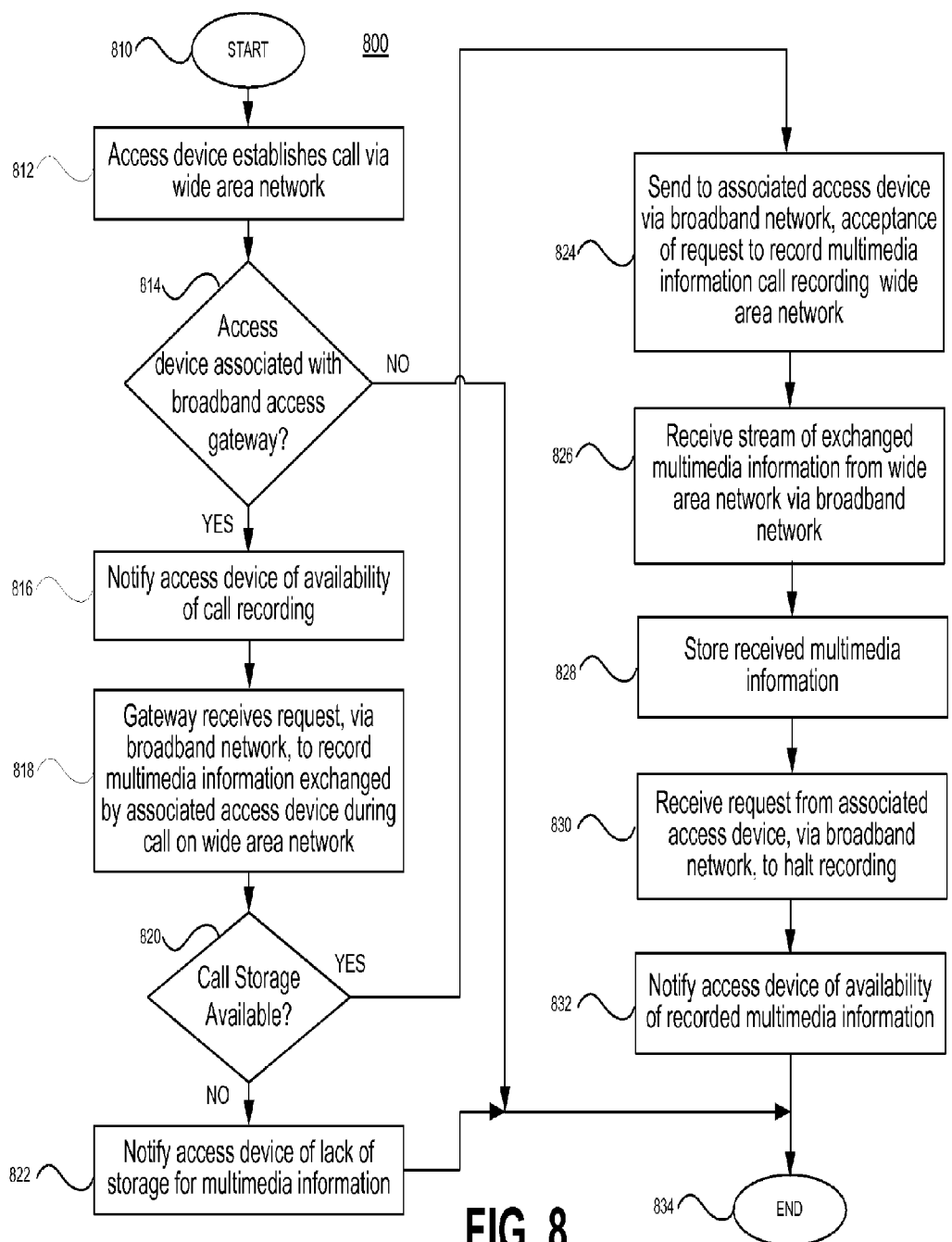
FIG. 8 is a flowchart of an exemplary method supporting handling of calls through simulcasting of multimedia information, in accordance with a representative embodiment of the present invention.

FIG. 8 is a flowchart 800 of an exemplary method supporting handling of calls through simulcasting of multimedia information, in accordance with a representative embodiment of the present invention. The following discussion makes references to the elements of FIG. 2. The method of FIG. 8 begins with an access device such as, for example, the mobile access device 224 in an idle state (i.e., not engaged in a call) (block 810). A call initiated or received by the mobile access device 224 is then established via a wide area network such as, for example, the GSM/EDGE/GPRS network 214 (block 812). The mobile access device 224 may comprise, for example, a mobile multimedia handset, a wireless personal digital assistant, or other similar device. During the establishment of the call, the wide area network 214 or the mobile access device 224, for example, may determine whether the mobile access device 224 is associated with a broadband access gateway such as, for example, the gateway 218 (block 814). This determination may, for example, use identification information contained within the mobile access device 224. Such identification information may comprise, for example, an electronic serial number, an Internet protocol (IP) address, a digital certificate, or other information that may identify a broadband access gateway associated with the mobile access device 224.

If the access device is not associated with a broadband access gateway, the method of FIG. 8 ends (block 834). If, however, it is determined that the mobile access device 224 has an associated broadband access gateway, the mobile access device 224 may notify the user that call recording is available (block 816). This notification may take the form of the call recording icon 320 shown in the illustration of FIG. 3, for example. At some point during the call, the user of the mobile access device 224 may desire to record the information being exchanged. In another representative embodiment of the present invention, the wide area network call may experience difficulties, and the user may be notified of the potential loss of the call with a screen such as, for example, the illustration of FIG. 5. For any of a number of reasons, the user may choose to activate recording of information exchanged during the call. The information to be recorded may comprise multimedia information such as, for example, streaming video, broadcast video, digitized voice, data, digitized video, still images, or other forms of digital media. Based upon a user activation of call recording, the broadband access gateway 218 may receive, via the broadband network, a request that call recording be activated (block 818). Upon receiving the request, the broadband access gateway 218 may determine whether storage is available for call recording (block 820), and may notify the user of the mobile access device 224 if there is a lack of storage for multimedia information for the call (block 822), in a manner such as that shown in FIG. 4, for example. In another representative embodiment of the present invention, a determination may be made whether sufficient network bandwidth is available to support recording of the multimedia information for the call. If a lack of storage or a lack of bandwidth exists, the method of FIG. 8 then ends (block 834).

If, however, storage is available for the recording of the call (block 820), the gateway may send to the access device, via the broadband and wide area networks, an acceptance of the request to record the multimedia information for the call (block 824). The gateway 218 may then begin receiving, via the broadband network, a stream of multimedia information for the call carried by the wide area network (block 826). The broadband access gateway 218 may then store the received multimedia information for the call (block 828). The broadband access gateway 218 may, for example, comprise the necessary call storage such as, for example, the storage 219 of FIG. 2, or may store the multimedia information for the call using external storage such as, for example, the storage 213 accessible via the Internet 206.

At a later point in the wide area network call, the user of the mobile access device 224 may choose to end call recording, and may cause the broadband access gateway 218 to receive a request to halt recording of the multimedia information for the call (block 830). The stream of multimedia information received from the wide area network via the broadband network then ceases. In another representative embodiment of the present invention, the request to halt recording may be initiated, automatically, when storage for the call information is exhausted, or bandwidth for transport of call information is no longer available. Following recording of the call, the broadband access gateway may notify the user of the mobile access device 224 of the availability of the recorded call information (block 832) in a manner such as that illustrated in FIG. 6, for example. The method of FIG. 8 then ends (block 834).

It should be noted that although the previous discussion makes reference to functions performed by a wireless carrier central office, other network elements may perform those functions in other arrangements in accordance with a representative embodiment of the present invention. For example, in an intelligent network (IN) environment, an applications processor (AP) or other suitable network entity may perform tasks that are described above as being performed by an wireless carrier central office, without departing from the spirit or scope of the present invention. It should also be noted that although the previous discussion focuses primarily on the capabilities and actions of the broadband access gateways 118, 218 of FIGS. 1 and 2, respectively, the same capabilities and actions may also apply to the router 130 of FIG. 1.

Aspects of the present invention may be found in a method of handling calls in a wide area network using simulcasting of multimedia information via a broadband access gateway. Such a method may comprise associating at least one access device with the broadband access gateway, and receiving from the associated access device via a broadband network, a request to record multimedia information exchanged during a call via a wide area network. The method may comprise receiving, via the broadband network, the multimedia information exchanged during the call, and storing the received multimedia information. A method in accordance with the present invention may also comprise determining whether a resource for recording the multimedia information is available. The method may comprise sending, via the broadband network, acceptance of the request to record multimedia information, if the resource is available. In addition, the method may comprise sending, via the broadband network, rejection of the request to record multimedia information, if the resource is not available. In some representative embodiments of the present invention, the method may comprise receiving, from the associated at least one access device, a request for stored multimedia information, and sending stored multimedia information to the associated at least one access device for playback. The method may also comprise receiving, via the broadband network, a request to halt recording of the exchanged multimedia information, and may comprise notifying the associated at least one access device of available stored multimedia information.

In various representative embodiments of the present invention, the at least one access device may comprise at least one of a mobile multimedia handset, a personal digital assistant (PDA), a personal computer (PC), a computer peripheral, a digital scanner, a digital camera, a printer, headphones, and a pointing device. The wide area network may comprise at least one of a cellular digital packet data (CDPD) network, a public switched telephone network (PSTN), a Global System for Mobile Communication (GSM) network, and a General Packet Radio Service (GPRS) network. The wide area network may also comprise a short message service (SMS) network, a GSM enhanced data rates for global evolution (EDGE) network, a time division multiple access (TDMA) network, an integrated digital enhanced network (iDEN), a code division multiple access (CDMA) network, and a CDMA2000 1xRTT network. The personal area network may comprise at least one of a Bluetooth network, an Institute of Electrical and Electronics Engineers (IEEE) 802.11 network, an Institute of Electrical and Electronics Engineers (IEEE) 802.15.3a network, and a cellular network. The broadband network may comprise at least one of a cable network, a digital subscriber loop network, a T1 network, a T3 network, a local multipoint distribution system (LMDS), a WiMAX network, and an Institute of Electrical and Electronics Engineers (IEEE) 802.16 network. The multimedia information in various representative embodiments according to the present invention may comprise at least one of streaming video, broadcast video, digitized voice, digital data, text, digitized audio, digitized still images, digitized video, and digitized music, and the resource for recording the multimedia information may comprise at least one of storage and bandwidth.

Other aspects of the present invention may be seen in a system for handling calls using simulcasting of multimedia information via a broadband access gateway. A system in accordance with a representative embodiment of the present invention may comprise at least one access device for communicating multimedia information, and a gateway communicatively coupled to a broadband network and at least one wireless interface. The gateway may be capable of selectively exchanging multimedia information between the at least one wireless interface and the broadband network, and of communicating with the at least one access device via the at least one wireless interface. The gateway may also be capable of associating at least one access device with the broadband access gateway, and of receiving, via a broadband network, a request to record multimedia information exchanged during a call via a wide area network. In addition, the gateway may be capable of receiving, via the broadband network, the multimedia information exchanged during the call, and of storing the received multimedia information.

In a representative embodiment of the present invention, the gateway may be capable of determining whether a resource for recording the multimedia information is available. The gateway may be capable of sending, via the broadband network, acceptance of the request to record multimedia information, if the resource is available. The gateway may also be capable of sending, via the broadband network, rejection of the request to record multimedia information, if the resource is not available. In addition, the gateway may be capable of receiving, from the associated at least one access device, a request for stored multimedia information, and of sending stored multimedia information to the associated at least one access device for playback. The gateway may be capable of receiving, via the broadband network, a request to halt recording of the exchanged multimedia information, and may be capable of notifying the associated at least one access device of available stored multimedia information.

In various representative embodiments of the present invention, the multimedia information may comprise at least one of streaming video, broadcast video, digitized voice, digital data, text, digitized audio, digitized still images, digitized video, and digitized music. The broadband network may comprise at least one of a cable network, a digital subscriber loop network, a T1 network, a T3 network, a local multipoint distribution system (LMDS), a WiMAX network, and an Institute of Electrical and Electronics Engineers (IEEE) 802.16 network. The at least one wireless interface in various representative embodiments may comprise at least one of a Bluetooth network interface, an Institute of Electrical and Electronics Engineers (IEEE) 802.11 network interface, an Institute of Electrical and Electronics Engineers (IEEE) 802.15.3a network, and a cellular network interface. The wide area network may comprise at least one of a cellular digital packet data (CDPD) network, a public switched telephone network (PSTN), a Global System for Mobile Communication (GSM) network, and a General Packet Radio Service (GPRS) network. The wide area network may also comprise a short message service (SMS) network, a GSM enhanced data rates for global evolution (EDGE) network, a time division multiple access (TDMA) network, an integrated digital enhanced network (iDEN), a code division multiple access (CDMA) network, and a CDMA2000 1xRTT network.

The gateway in a system in accordance with a representative embodiment of the present invention may be capable of informing the wide area network, via the broadband network, of acceptance of multimedia information by the associated at least one access device via the personal area network. The at least one access device may comprise at least one of a mobile multimedia handset, a personal digital assistant (PDA), a personal computer (PC), a computer peripheral, a digital scanner, a digital camera, a printer, headphones, and a pointing device. The multimedia information may be stored within the gateway, and the resource for recording the multimedia information may comprise at least one of storage and bandwidth.

Yet other aspects of the present invention may be observed in a broadband access gateway apparatus supporting handling of calls using simulcasting of multimedia information. The apparatus may comprise at least one wireless interface supporting communication via a personal area network, at least one network interface for communication via a broadband network, and at least one processor capable of associating at least one access device with the broadband access gateway apparatus. The at least one processor may be communicatively coupled to the at least one wireless interface and the at least one network interface. The at least one processor may be capable of receiving, via the broadband network, multimedia information simultaneously communicated wirelessly to the associated at least one access device via a wide area network. The at least one processor may also be capable of storing the received multimedia information, and of causing the at least one access device to be notified of available stored multimedia information. In a representative embodiment of the present invention, the at least one processor may be capable of communicating the stored multimedia information to the associated at least one access device for playback.

In a representative embodiment in accordance with the present invention, the at least one wireless interface may comprise at least one of a Bluetooth network interface, an Institute of Electrical and Electronics Engineers (IEEE) 802.11 network interface, an Institute of Electrical and Electronics Engineers (IEEE) 802.15.3a network, and a cellular network interface. The broadband network may comprise at least one of a cable network, a digital subscriber loop network, a T1 network, a T3 network, a local multipoint distribution system (LMDS), a WiMAX network, and an Institute of Electrical and Electronics Engineers (IEEE) 802.16 network. In various representative embodiments according to the present invention, the at least one access device may comprise at least one of a mobile multimedia handset, a personal digital assistant (PDA), a personal computer (PC), a computer peripheral, a digital scanner, a digital camera, a printer, headphones, and a pointing device. The multimedia information may comprise at least one of streaming video, broadcast video, digitized voice, digital data, text, digitized audio, digitized still images, digitized video, and digitized music.

The wide area network in various representative embodiments of the present invention may comprise at least one of a cellular digital packet data (CDPD) network, a public switched telephone network (PSTN), a Global System for Mobile Communication (GSM) network, and a General Packet Radio Service (GPRS) network. The wide area network may also comprise a short message service (SMS) network, a GSM enhanced data rates for global evolution (EDGE) network, a time division multiple access (TDMA) network, an integrated digital enhanced network (iDEN), a code division multiple access (CDMA) network, and a CDMA2000 1xRTT network. In addition, in a representative embodiment of the present invention, the received multimedia information may be stored within the broadband access gateway.

In a representative embodiment of the present invention, the wireless local area networks may include data networks such as, for example, Institute of Electrical and Electronics Engineer (IEEE) 802.11a/b/g/n compliant wireless networks such as those located in homes, hot spots or an office. Such local area networks may operate in unlicensed radio frequency spectrum such as in, for example, the 2.4 and 5 gigahertz regions. Examples of wide area networks may include cellular digital packet data (CDPD), voice and data networks such as public switched telephone networks (PSTN), Global System For Mobile Communication (GSM), GSM General Packet Radio Service (GPRS), GSM Short Message Service (SMS), GSM Enhanced Data Rates For Global Evolution (EDGE), North American Time Division Multiplex Access (TDMA), iDEN, Code Division Multiple Access (CDMA) and CDMA2000 1xRT, Universal Mobile Telecommunications System (UMTS) network, to name only a few.

A personal area network (PAN) may be formed by a plurality of wireless communication access devices such as, for example, mobile multimedia handsets, PDAs, telephones, and computers. Other elements of such a network may, for example, include computer peripherals such as digital scanners, digital cameras, printers, headphones, and pointing devices, that may be located within the immediate proximity of a person. A PAN may be an ad-hoc network of such communication devices. In a representative embodiment of the present invention, access devices within the PAN may communicate with other access devices within the PAN and also with other access devices that are located in other networks accessible via the PAN. The personal area networks may include data networks such as, for example, a Bluetooth compliant network, and Institute of Electrical and Electronics Engineer (IEEE) 802.15.3a compliant wireless networks. Such personal area networks may operate in unlicensed radio frequency spectrum such as, for example, the 2.4 and 5 gigahertz regions. Details of one example of a personal area network are provided in the document "Bluetooth Core Specification V1.2", Nov. 5, 2003, from Bluetooth SIG, Inc., the complete subject matter of which is hereby incorporated herein by reference, in its entirety. For example, in a Bluetooth® wireless PAN, a first Bluetooth®-enabled wireless access device may communicate with a second Bluetooth®-enabled wireless access device within the PAN. Additionally, either of the first and second Bluetooth®-enabled wireless access devices may communicate with the Internet or another LAN or WAN via the Bluetooth® wireless PAN.

In a representative embodiment of the present invention, a gateway may be adapted to provide seamless and transparent communication between a plurality of access devices and a plurality of networks. The functionality of the gateway may be divided, for example, into application content functionality, and configuration and management functionality. The application content functionality may, for example, deal with the types of applications that may be supported by the gateway as well as the various types of data that may be received, processed and/or transmitted by the gateway. In this regard, application content functionality may also include the manner in which other devices and/or systems may utilize data from the gateway.

Content and application services are important because all the information coming into and leaving the home from either the WAN side (i.e., the broadband connection side), or from the PAN side (i.e., the access device side) converges at the gateway. The PAN side may comprise Bluetooth, wireless LAN (IEEE 802.11a/b/g/n), IEEE 802.15.3a ultra-wideband, or cellular, for example. Notwithstanding, the gateway may be adapted to convert, for example, wirelessly received GSM-formatted information into, for example, Internet protocol (IP)-formatted information and in reverse, converts IP-formatted information into wireless GSM-formatted information suitable for over-the-air transmission. Support for other wireless communication protocols such as TDMA, CDMA, and UMTS may also be provided. In a representative embodiment of the present invention, the gateway may comprise suitable circuitry, logic and/or code that may be adapted to receive and process MPEG related data, which may be suitable for display on a screen. The gateway in an embodiment of the present invention functions as a focal point where data converges from a plurality of wired and wireless services. Although, in a particular embodiment of the present invention the gateway may do very little in terms of actual content aggregation, there is virtual aggregation of data. The converged data may be integrated and or otherwise utilized to offer unique opportunities for launching various content and application services from a single strategic location. Since the gateway in an embodiment of the present invention is the focal point where data converges, one or more protocol stacks may be employed for launching the various content and application services.

The gateway in a representative embodiment of the present invention may be adapted to route calls based on established rules that may be programmed into the gateway. For example, the gateway may be governed by a rule which states that local calls are to be routed to an incumbent local exchange carrier (iLEC), while long distance calls are to be handled by Long Distance Carrier Company. Accordingly, when a call originates at the gateway and it is determined that the call is a local call, the gateway may be adapted to route the call to the iLEC. However, if the gateway determines that the call is a long distance call, then the gateway may be adapted to route the call to Long Distance Carrier Company.

A representative embodiment of the present invention may leverage existing broadband infrastructure that is commonly found in many homes and businesses today. Because a consumer is already paying for the use of the broadband infrastructure in their home or office, leveraging the use of the existing broadband infrastructure for communication with wide area networks results in minimal or no communication costs. The broadband infrastructure may be, for example, a cable or DSL infrastructure.

The wireless interface function provided by the gateway located within a home, for example, may be utilized to route or communicate a great deal of traffic to a wired network such as a broadband network or a wireless network such as a GSM or CDMA network via a broadband connection. In other words, the wireless gateway infrastructure provided by a representative embodiment of the present invention provides a scalable network infrastructure that rides on an existing access infrastructure already supplied by a broadband service provider to a home, office or business. Additionally, the scalable infrastructure provided by the gateway also solves the problems associated with signal penetration and propagation, thereby providing improved quality of service (QoS). From a market perspective, a wireless service provider may now have access to the necessary infrastructure to provide improved wireless services to users within a home or office. Accordingly, in order to rapidly increase their growth, wireless service providers may now target that portion of the in-home landline or plain old telephone system (POTS) business, which have traditionally been handled by incumbent local exchange carriers (ILECs) or other LECs.

The unlicensed mobile access gateway described above may possess a significant amount of processing power. The gateways of existing systems fall short of realizing the full potential of the merged wired and wireless communication network that is enabled by a representative embodiment of the present invention. Numerous basic and enhanced communication services may be enabled or provided by the gateway. Support for access devices such as, for example, mobile multimedia handsets and PDAs may be involved in order to utilize these basic and enhanced communication services enabled by the new wave of digital technologies. Current and/or proposed mobile access gateway systems, however, do not provide the range of support needed for their use by the everyday consumer.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. An gateway device for handling calls using multimedia information, the gateway comprising:
   a processor configured to receive a request for recording of multimedia information exchanged during a call, the processor being configured to receive the multimedia information and store the multimedia information.

2. The gateway according to claim 1, wherein the request to record the multimedia information is received by the processor via a broadband network.

3. The gateway according to claim 1, wherein the multimedia information to be recorded is received by the processor via a wide area network.

4. The gateway according to claim 1, wherein the multimedia information to be recorded is stored on the gateway device.

5. The gateway according to claim 1, wherein the processor is configured to store the multimedia information to be recorded on another device that is remote from but accessible to the gateway.

6. The gateway according to claim 1, wherein the multimedia information comprises at least one of: streaming video, broadcast video, digitized voice, digital data, text, digitized audio, digitized still images, digitized video, and digitized music.

7. A method of handling calls for at least one access device using multimedia information, the method comprising:
   requesting to record multimedia information exchanged during a call;
   receiving the multimedia information via a broadband network; and
   storing the multimedia information.

8. The method according to claim 7, wherein the multimedia information to be recorded is received by a gateway via a wide area network.

9. The method according to claim 7, wherein the multimedia information to be recorded is stored on a gateway device.

10. The method according to claim 7, wherein a gateway is configured to store the multimedia information to be recorded from the call on an access device on another device that is remote from but accessible to the gateway.

11. The method according to claim 10, wherein the another device is accessible to the gateway via a path comprising one or more of a modem, a broadband access provider, a transport network, and an Internet connection.

12. The method according to claim 7, wherein the broadband network comprises one of a cable network, a digital subscriber loop network, a T1 network, a T3 network, a local multipoint distribution system (LMDS), a WiMAX network, and an Institute of Electrical and Electronics Engineers (IEEE) 802.16 network.

13. A system for handling calls from at least one access device using simulcasting of multimedia information, the system comprising:
   a gateway communicatively coupled to a broadband network configured to communicate with the at least one access device;
   the gateway capable of receiving a request to record multimedia information exchanged during a call;
   the gateway capable of receiving the multimedia information exchanged during the call; and
   the gateway capable of receiving a request from the access device to store the received multimedia information.

14. The system according to claim 13, wherein the request to record the multimedia information is received by the gateway via a broadband network.

15. The system according to claim 13, wherein the multimedia information to be recorded is received by the gateway via a wide area network.

16. The system according to claim 13, wherein the multimedia information to be recorded is stored on the gateway device.

17. The system according to claim 13, wherein the multimedia information to be recorded is stored on another device that is accessible to the gateway.

18. The system according to claim 13, wherein the multimedia information to be recorded is stored on another device that is accessible to the gateway via a path comprising a broadband access provider.

19. The system according to claim 13, wherein the multimedia information to be recorded is stored on another device that is accessible to the gateway via a path comprising a transport network.

20. The system according to claim 13 wherein the multimedia information comprises at least one of: streaming video, broadcast video, digitized voice, digital data, text, digitized audio, digitized still images, digitized video, and digitized music.

* * * * *